United States Patent [19]
Kohlmeier et al.

[11] Patent Number: 5,466,005
[45] Date of Patent: Nov. 14, 1995

[54] MOTOR VEHICLE

[75] Inventors: Hans-Heinrich Kohlmeier, Kolitzheim; Fritz Gerber, Walheim, both of Germany

[73] Assignee: Dr. Ing. h.c.F. Porsche AG, Germany

[21] Appl. No.: 172,210

[22] Filed: Dec. 23, 1993

[30] Foreign Application Priority Data

Dec. 24, 1992 [DE] Germany .......................... 42 44 216.8

[51] Int. Cl.⁶ ................................. B62D 21/00
[52] U.S. Cl. ...................... 280/781; 180/311; 296/195; 296/204
[58] Field of Search ..................... 280/107, 781; 296/204, 195, 194; 180/55, 56, 58, 62, 291, 299, 311

[56] References Cited

U.S. PATENT DOCUMENTS

| | | | |
|---|---|---|---|
| 1,948,744 | 2/1934 | Curtiss | 180/12 |
| 2,047,336 | 7/1936 | Stout | 180/62 |
| 2,177,896 | 10/1939 | Lee | 296/205 |
| 4,773,675 | 9/1988 | Kosuge | 280/781 |
| 4,869,539 | 9/1989 | Cassese | 280/781 |
| 5,074,587 | 12/1991 | Schwede et al. | 280/781 |

FOREIGN PATENT DOCUMENTS

| | | | |
|---|---|---|---|
| 0295662 | 12/1988 | European Pat. Off. | |
| 592840 | 2/1934 | Germany | |
| 1177016 | 3/1970 | Germany | |
| 3905650C1 | 1/1990 | Germany | |
| 4030921 | 4/1991 | Germany | 280/781 |
| 0112788 | 5/1991 | Japan | 296/194 |

*Primary Examiner*—Margaret A. Focarino
*Assistant Examiner*—Paul N. Dickson
*Attorney, Agent, or Firm*—Evenson, McKeown, Edwards & Lenahan

[57] ABSTRACT

An exterior lateral side rail in the area of a passenger compartment is adjoined in the forward structure and/or rearward structure of a vehicle by additional side rails which, in particular, are provided with a right-angle bend. Elements that reinforce the vehicle body are connected with the side rails at one end of the elements, and with an underbody or underbody components at the other end of the elements. The reinforcing elements include a first V-shaped strutting which extends in an approximately horizontal plane in the longitudinal direction of the vehicle and which is connected with a second V-shaped strutting which is arranged in an approximately perpendicular transverse plane. By its free ends, the first strutting is fastened to the side rails and, by its opposite ends, it is fastened to the second strutting at a common connection area. The second strutting is supported by its free ends on the side rails.

12 Claims, 5 Drawing Sheets

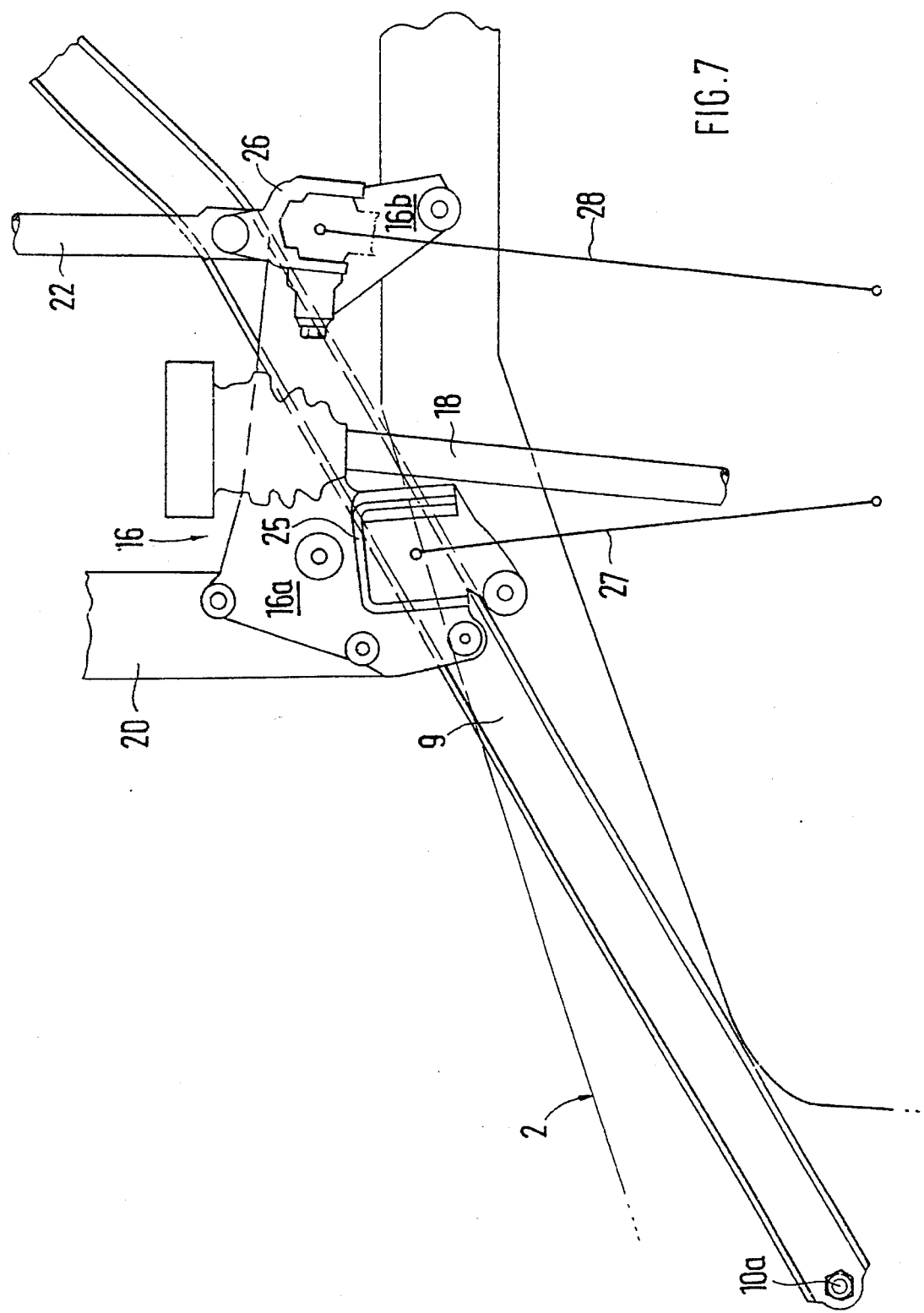

MOTOR VEHICLE

BACKGROUND AND SUMMARY OF THE INVENTION

The present invention relates to a motor vehicle having outer lateral side rails in the area of a passenger compartment which are adjoined by additional side rails in the forward structure of the vehicle and/or in the rearward structure of the vehicle which are provided particularly with a right-angle bend. Elements which reinforce the vehicle body are connected with the side rails, at one of the element ends, and/or with an underbody or underbody components at their other end.

From German Patent Document DE-39 05 650 C1, a self-supporting motor vehicle body is known which, for increasing its stiffness with respect to torsion, has struts on the underbody which are fastened to the side rail by means of at least one end and are fixed to the underbody by means of their opposite end.

An object of the present invention is to provide a motor vehicle in which, by means of reinforcing elements, an optimal stiffness with respect to torsion of the vehicle body and a defined support of a wheel suspension are ensured.

This and other objects are achieved by the present invention which provides a motor vehicle having a vehicle body, comprising outer lateral side rails in a passenger compartment area and adjoining additional side rails in at least one of the forward structure of the vehicle and the rearward structure of the vehicle, said side rails having a right-angle bend, and reinforcing elements which reinforce the vehicle body. The reinforcing elements are connected with the side rails on one end of the elements and to an underbody at another end of the elements. The reinforcing elements include a first V-shaped strutting which extends in an approximately horizontal plane in a longitudinal direction of the vehicle and a second V-shaped strutting, connected to the first strutting and which extends in an approximately perpendicular transverse plane. The first strutting has free ends fastened to the side rails and other ends fastened to the second strutting at a common connecting area. The second strutting has free ends which support the second strutting on the side rails.

Some of the advantages achieved by the present invention are that, via two struttings, which are connected with one another and are arranged in different planes, a desired stiffness with respect to torsion can be achieved in a simple manner and a support of a wheel suspension can take place on lateral support parts. In certain embodiments, these lateral support parts are held and supported between the strutting and a side rail of the vehicle body.

In certain embodiments of the invention, the struttings have a V-shaped construction, the first strutting extending in a horizontal plane and the second strutting extending in a perpendicular transverse plane, and the two struttings are connected with one another. The struttings are made of profiled struts, tubes or the like and are in each case fastened to the side rail by means of one of their ends. The other ends of the struts, which form the tip of the V, are directly connected with one another. For achieving a stiffness with respect to torsion and according to the requirements, the struttings may be provided in the rearward and in the forward structure of the vehicle, or only in the rearward structure, or only in the forward structure. The struts extend in a diverging manner from the longitudinal center axis of the vehicle to the side rails.

For supporting the links of a wheel suspension, in certain embodiments one support part respectively is provided for each vehicle side and extends in the longitudinal direction of the vehicle. On its bottom side, this support part is connected to the horizontal strutting and, on its top side, it is connected to the side rail. For the transverse support, a cross member is arranged between the lateral support parts, and a transverse rod may be provided between the struts. This transverse rod will be provided only if the struts of the horizontal strutting have a bend.

The support parts have a U-shaped construction such that a wheel drive shaft can be guided through between vertical legs, and the remaining web is screwed to the horizontal strutting. In or on the legs of the support parts, respective receiving devices for bearings of links of a wheel suspension are provided. These receiving devices are an integrating component of the support part.

So that a drive assembly can be arranged in the vehicle unimpaired by the struttings, in certain embodiments the horizontal strutting has bent struts which are then supported via the transverse rod in the bent area. This transverse rod may be made of a hollow profile, a tube or of profiled solid material.

For fastening the free ends of the cross member, the support part has receiving devices in which the ends, which are bent at right angles, are fastened by screws. The support part may be a casting or a sheet metal stamping.

Other objects, advantages and novel features of the present invention will become apparent from the following detailed description of the invention when considered in conjunction with the accompanying drawings.

BRIEF DESCRIPTION OF THE DRAWINGS

FIG. 7 is an enlarged plan view of the connection between the support part and the first strutting as well as the links of a wheel suspension.

DETAILED DESCRIPTION OF THE DRAWINGS

Figure 1:
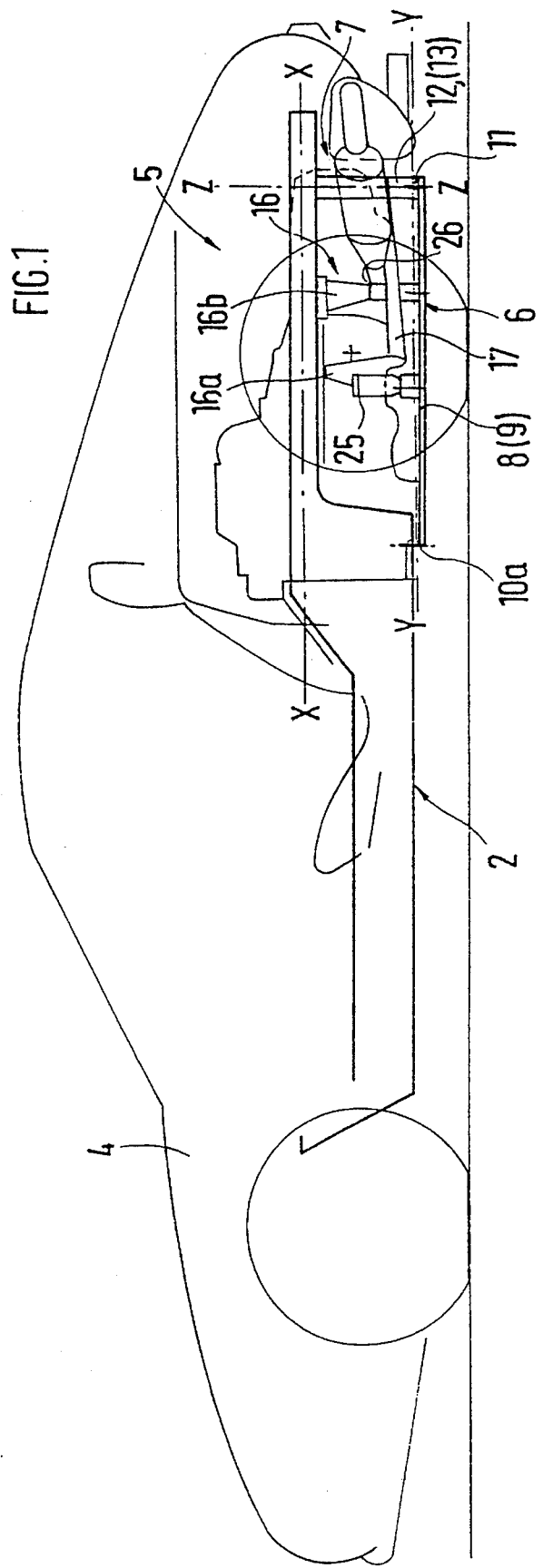
FIG. 1 is a lateral view of struttings of the present invention only in the rearward structure of a vehicle.
Figure 2:
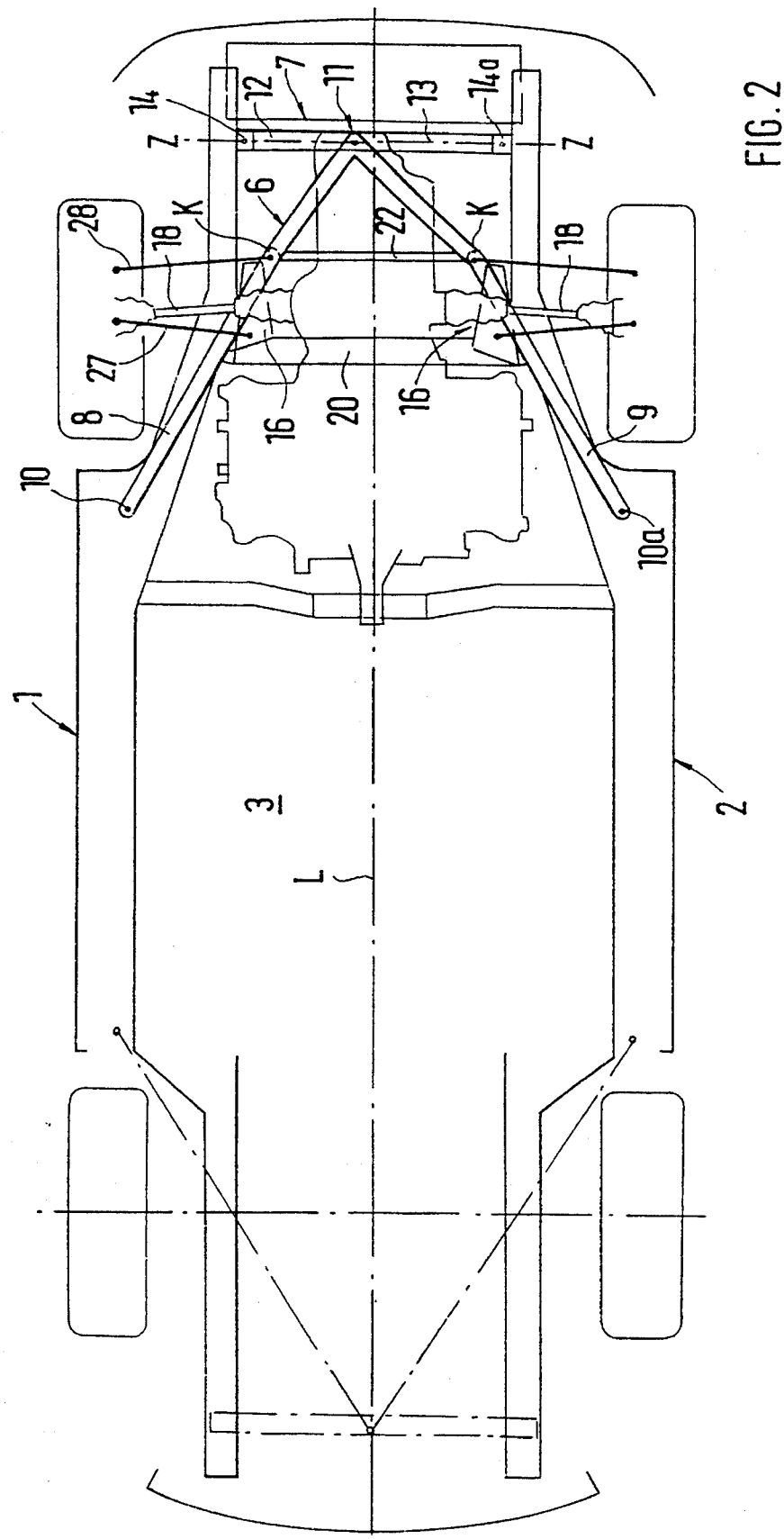
FIG. 2 is a plan view of FIG. 1, with possible forward struttings being illustrated by a dash-dotted line.

A motor vehicle as shown in FIGS. 1 and 2 essentially comprises a vehicle body structure having side rails 1, 2 as well as a floor part 3 and a body 4. In the rearward structure 5 of the vehicle, the side rails 1, 2 are provided with a right-angle bend in the vertical and in the longitudinal directions so that the ends of the side rails 1, 2 are arranged in a plane X—X which is situated higher than the side rails in the center area of the vehicle.

Figure 3:
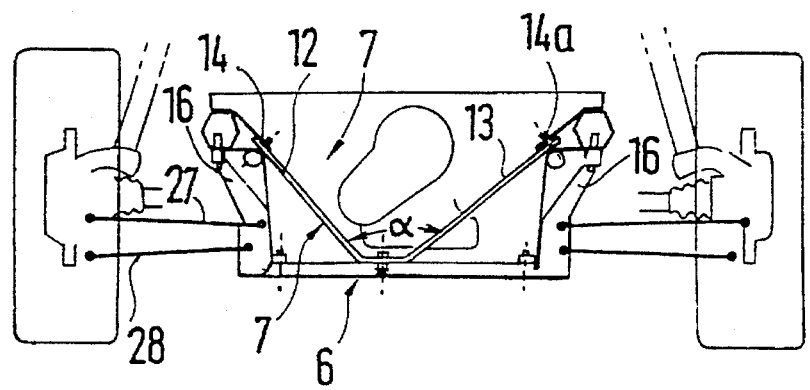
FIG. 3 is a frontal view of FIG. 1.

With struttings 6 and 7 in the rearward structure and/or the forward structure of the vehicle, the body structure is reinforced for achieving an optimal stiffness with respect to torsion. The struttings 6 and 7 comprise individual struts 8, 9 and 12, 13, respectively. The struttings 6 and 7 can be rods or profiles or similar devices which are set in a V-shape with respect to one another, as shown in FIGS. 2 and 3. One strutting 6 is arranged in a horizontal longitudinal plane Y—Y (FIG. 1), and the other strutting 7 is arranged in a perpendicular transverse plane Z—Z.

As illustrated in detail in FIGS. 2 and 3, the struts 8 and 9 of the first horizontal strutting 6 are each connected by their free ends 10, 10a to one of the side rails 1, 2, and are connected, at their other end areas 11 which meet approximately in the longitudinal center plane L of the vehicle, with the second perpendicular strutting 7, preferably at one point. For this purpose, the second strutting 7 comprises the struts 12 and 13. These struts 12, 13 are connected at their free ends 14, 14a with the side rails 1, 2 and extend downward at an opening angle α, where the strutting 7 is connected with the struts 8, 9 of the first strutting 6.

The struttings 6, 7 are positioned such that a rotating of the free ends of the side rails 1, 2 about a longitudinal center axis of rotation is prevented when torsional stress is applied. For this purpose, the second strutting 7 is fastened as far as possible toward the rear and on the free ends of the side rails 1, 2, and the ends 10, 10a of the struts 8, 9 of the first horizontal strutting are connected with the side rails 1, 2 which extend to the plane a—a which is situated lower than plane X—X.

In an area between the first strutting 6 and the side rails 1, 2 of the plane X—X, the lateral support parts 16 are provided in each case and are connected with the struts 8, 9 and the side rails 1, 2 in a screwed manner.

Figure 4:
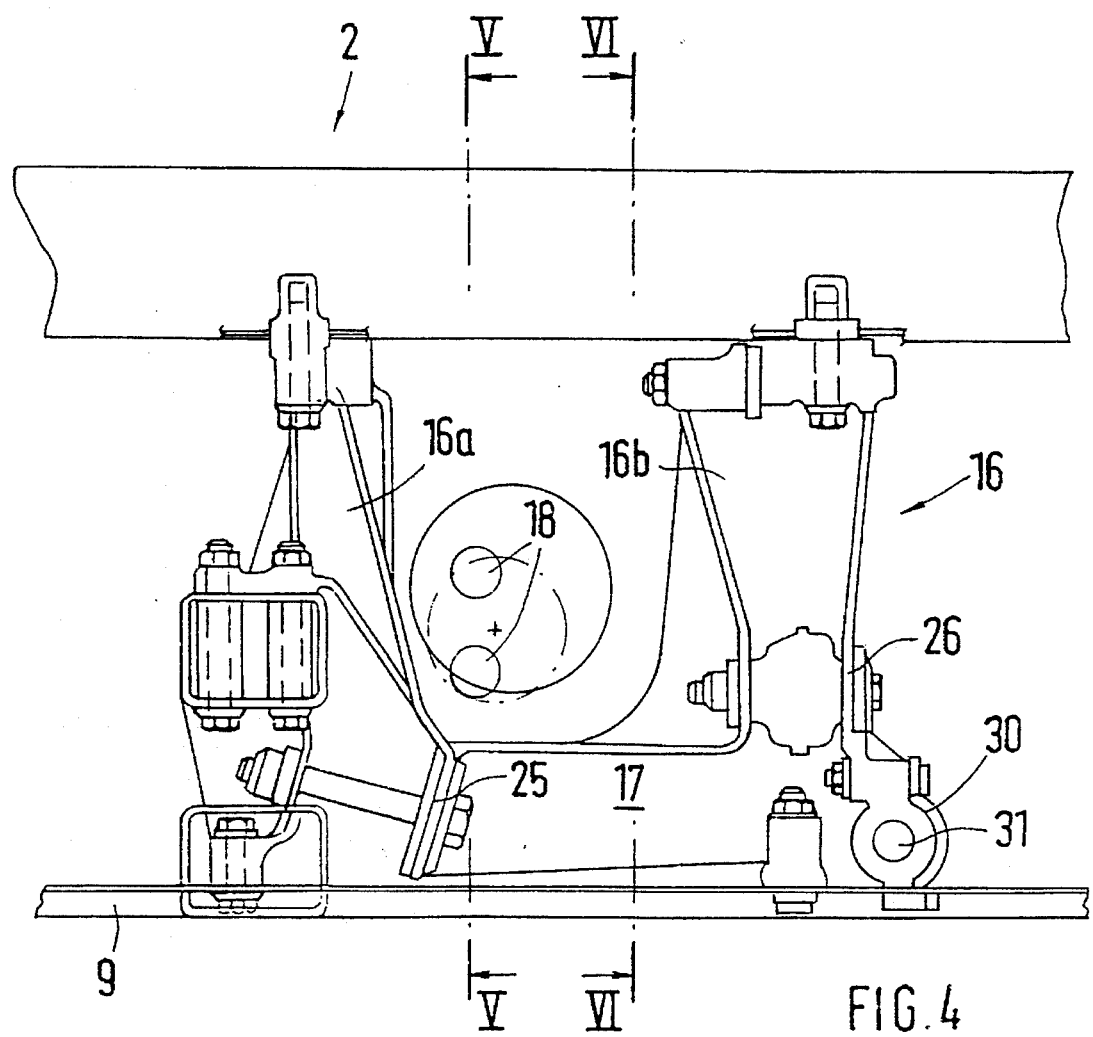
FIG. 4 is an enlarged lateral view of the lateral support part of the present invention.

As seen in FIG. 4, the support part 16 is a U-shaped element which extends in the longitudinal direction of the vehicle and comprises two legs 16a, 16b which are connected via a web 17. The support part 16 is arranged in such a manner that a drive shaft 18 can extend between the two legs 16, 16b. The web 17 is connected with the strut 8, 9, and the ends of the legs 16a, 16b are connected with the side rails 1, 2.

Figure 5:
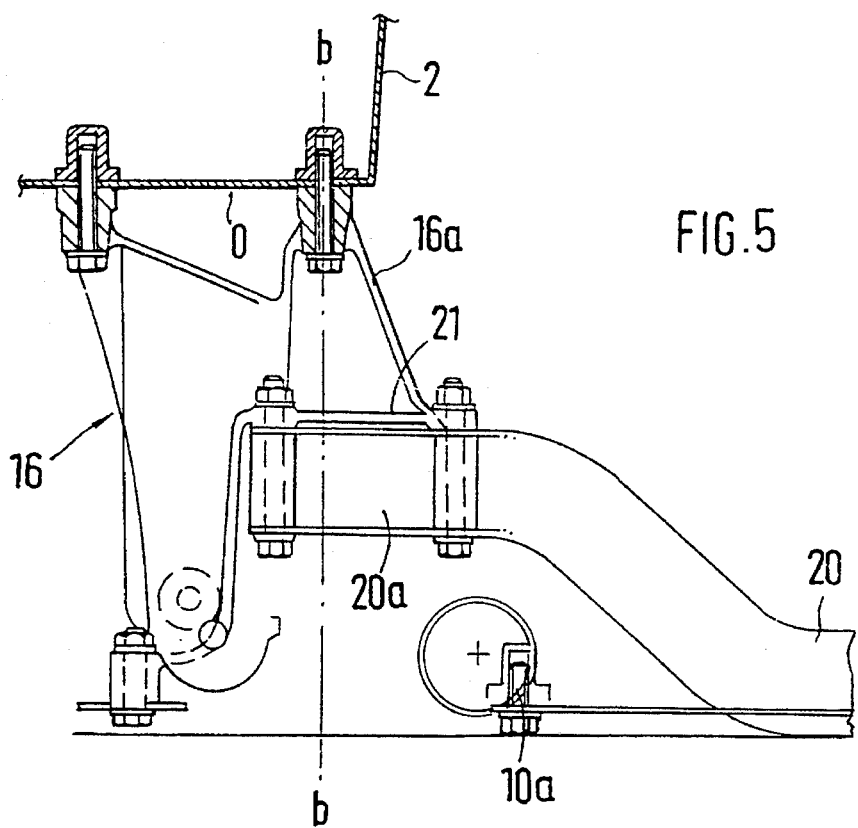
FIG. 5 is an enlarged sectional view V—V according to FIG. 4 of the connection between the support part and the cross member.

As shown in FIG. 5, a cross member 20 is arranged between the lateral support parts 16 of each side. By means of its free end 20a, this cross member 20 is fixed in a receiving device 21 of the leg 16a via screws. The cross member 20 has ends 20a, which are bent at right angles, in such a manner that the center portion of the support 20 is situated lower than the free ends 20a.

When bent struts 8, 9 are used, as illustrated, for example, in FIG. 2, a transverse rod 22 or the like is interposed in the bent area K. At its end, the transverse rod 22 is flattened at 23 and is held by means of at least one screw 24 between the strut 8, 9 and the support part 16.

In the legs 16a, 16b, the support part 16 is constructed with receiving devices 25, 26 for bearings of links 27, 28 or a connecting rod (FIGS. 2 and 4). The struttings 6 and 7 are therefore constructed not only for achieving a stiffness with respect to torsion but are also used for supporting the wheel suspension.

In certain embodiments, the struts 8, 9 and 12, 13 of the struttings 6, 7 are, for example, hat-shaped profiles, the cross member 20 consisting of a polygonal closed profile, and the transverse rod 22 consisting of a tube.

Figure 6:
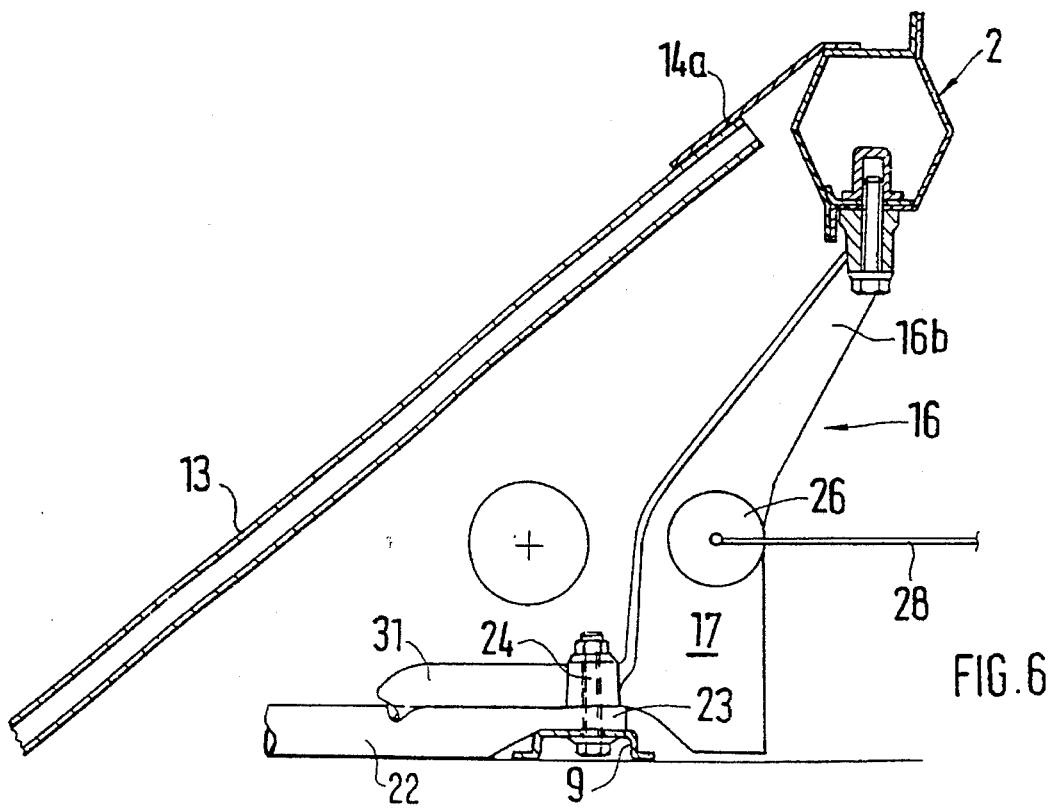
FIG. 6 is an enlarged sectional view VI—VI according to FIG. 4 of the connection of the support part, the second strutting and the first strutting.

As shown in FIGS. 4 and 6, by means of the support part 16, a stabilizer 31 can be held via a clip 30, this stabilizer extending transversely with respect to the vehicle and connected with a wheel carrier via a suspension (not shown).

As illustrated in FIG. 2 by a dash-dotted line, struttings 6 and 7 may also be arranged in the forward structure, in which case the strutting 7 may be replaced by a cross member between the two side rails 1 and 2, and the horizontal struts are held on a floor panel or another high-strength connection. It is also possible to connect the strutting with a bumper or a center bracket of the bumper.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A motor vehicle having a vehicle body comprising:

outer lateral side rails in a passenger compartment area having a right-angle bend;

vehicle body reinforcing elements connected with the lateral side rails, wherein the reinforcing elements include a first V-shaped strutting which extends in an approximately horizontal plane in a longitudinal direction of the vehicle and a second V-shaped strutting, connected to the first strutting and which extends in a substantially perpendicular plane transverse with respect to the longitudinal direction of the vehicle, the first strutting having free ends fastened to the side rails with the apex of the first strutting fastened to the second strutting at its apex, the second strutting having free ends fastened to the side rails so as to support the second strutting on the side rails.

2. A motor vehicle according to claim 1, wherein the first strutting forms in connection with the second strutting a high-strength connection, and is arranged in at least one of the rearward structure and in the forward structure of the vehicle.

3. A motor vehicle according to claim 1, further comprising at least one transverse rod, wherein the second strutting includes individual struts, and the first strutting includes individual struts which extend from exterior side rails to approximately the longitudinal center axis of the vehicle and which are supported with respect to one another in the horizontal direction by the transverse rod and which are supported in the vertical direction by the second strutting.

4. A motor vehicle according to claim 3, further comprising a lateral support part arranged between each strut of the first strutting and the side rails, each lateral support part extending approximately in a perpendicular plane, aligned in the longitudinal direction of the vehicle, and fastened at a bottom side to an associated strut of the first strutting and at a top side to one side rail respectively by a plurality of fasteners.

5. A motor vehicle according to claim 4, further comprising a cross member between the support parts, said cross member extending at a distance from the transverse rod.

6. A motor vehicle according to claim 5, where the cross member is connected, in an approximately common perpendicular plane, with the fastening of the support parts on the side rails on the support part of each vehicle side.

7. A motor vehicle according to claim 4, wherein the support parts have a U-shaped construction with two legs extending in the longitudinal direction of the vehicle, accommodate a wheel drive shaft guided through between the two legs which are each on their respective end connected with the side rails and have in each said leg at least one receiving device for a bearing of links of a wheel suspension.

8. A motor vehicle according to claim 7, further comprising a clip coupled to one of the legs for holding in position on the leg a stabilizer.

9. A motor vehicle according to claim 4, wherein the struts are shaped profiles connected by a web on the respective support part via screws.

10. A motor vehicle according to claim 3, wherein the individual struts of the first strutting have a bend in the area of which the transverse rod is fastened, and the struts are supportable with respect to one another.

11. A motor vehicle according to claim 4, wherein the transverse rod is tube-shaped and has flattened free ends held in a tightly clamped-in manner between the respective support part and the respective strut.

12. A motor vehicle according to claim 5, wherein the cross member comprises a center which extends into the horizontal plane of the first strutting, and has free ends bent at right angles and extending in a plane that is situated higher than the center, are held in receiving devices of the support parts and are fastened by screws.

* * * * *